3,051,752
METHOD FOR THE PREPARATION OF N,N,N',N',N'',N''-HEXASUBSTITUTED 1,2,3-TRIAMINOPROPANES
Richard C. Doss and Howard W. Bost, Bartlesville, Okla., assignors to Phillips Petroleum Company, a corporation of Delaware
No Drawing. Filed Jan. 31, 1957, Ser. No. 637,590
8 Claims. (Cl. 260—570.5)

This invention relates to a process for the preparation of N,N,N',N',N'',N''-hexasubstituted 1,2,3-triaminopropanes.

It has been found that hexasubstituted aminopropanes of the general formula—

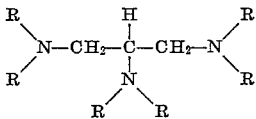

can be prepared by reacting a secondary amine with a compound of the general formula—

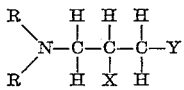

wherein R is selected from the group consisting of alkyl, cycloalkyl, alkenyl, cycloalkenyl, aryl, alkaryl and aralkyl radicals, said R's can be alike or unlike and the number of carbon atoms in each R does not exceed 10; and radicals which in combination with nitrogen constitute carbon-nitrogen and carbon-nitrogen-oxygen rings having not less than 5 and not more than 6 members of which at least 4 members are carbon atoms; X is a halogen selected from the group consisting of chlorine, bromine and iodine; and Y is selected from the group consisting of

R being as hereinbefore described, and a halogen selected from the group consisting of chlorine, bromine, and iodine, at an elevated temperature.

The above identified compounds being highly hypergolic are useful as fuel components in the propulsion of rockets, guided missiles, etc., when used in conjunction with an oxidizer.

It is an object of this invention to provide an improved process for the preparation of N,N,N',N',N'',N''-hexasubstituted 1,2,3-triaminopropanes.

This and other objects of the invention will become more readily apparent from the following description and discussion.

It is known to prepare diamines by the reaction of ammonia or amines on dihalogen compounds. The action of ammonia on ethylene dibromide, for example, yields ethylenediamine. It might be expected that 1,2,3-triaminopropanes could be prepared in a similar manner by the action of ammonia or amines on a 1,2,3-trihalopropane. It has been found, however, that very little, if any, N,N,N',N',N'',N''-hexasubstituted 1,2,3-triaminopropane is formed when a 1,2,3-trihalopropane is treated with a secondary amine. An attempt to prepare N,N,N',N',N'',N''-hexamethyl-1,2,3-triaminopropane by the action of dimethylamine on 1,2,3-trichloropropane gave only a four percent yield of the desired product, and when 1,2,3-tribromopropane was used as the starting material, the run was also unsuccessful.

A satisfactory method has now been found whereby high yields of N,N,N',N',N'',N''-hexasubstituted 1,2,3-triaminopropanes can be obtained. An N,N-disubstituted-1-amino-2,3-dihalopropane or an N,N,N',N'-tetrasubstituted 1,3-diamino-2-halopropane is used as the starting material. These compounds are prepared by methods other than the direct action of a secondary amine on a 1,2,3-trihalopropane. It appears that the success of the method of this invention is dependent upon the use of a halo substituted propane in which either one or both of the end carbon atoms are substituted with an

group. Treatment of either of these halogen substituted compounds with a secondary amine then yields the desired N,N,N',N',N'',N''-hexa substituted 1,2,3-triaminopropane.

One method disclosed in the prior art which can be used for the preparation of an N,N-disubstituted 1-amino-2,3-dihalopropane is by the action of a secondary amine on an allyl halide, namely allyl chloride, allyl bromide, or allyl iodide according to the following reaction.

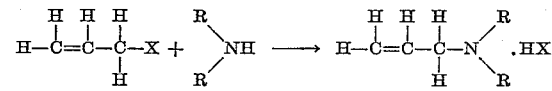

This reaction is conveniently effected at a temperature in the range between 0° and 20° C. with from 2 to 4 mols of the secondary amine being used per mol of allyl halide. It is convenient to carry out this reaction in the presence of a solvent and for this purpose materials such as dimethyl ether, diethyl ether, benzene, toluene, pentane, hexane, methylcyclohexane, cyclohexane, cyclopentane, and methylcyclopentane are applicable. A solution of the allyl halide in one of the solvents mentioned can be added, with stirring, to a solution of the secondary amine. Addition of the allyl halide is regulated in such a manner that the temperature can be easily controlled. After the allyl halide has been introduced, the reactants are generally stirred at room temperature (20–30 C.) for a period in the range from 15 minutes to 4 or 5 hours to allow time for completion of the reaction. The reaction mixture is then filtered to separate any hydrohalide which formed from the reaction of the excess secondary amine and hydrogen halide, and the filtrate is distilled to recover the N,N-disubstituted allylamine. Halogenation of the double bond yields the desired N,N-disubstituted 1-amino-2,3-dihalopropane.

The procedure hereinbefore described represents a convenient method for the preparation of N,N-disubstituted 1-amino-2,3-dihalopropanes. The method is applicable when the R groups of

are alkyl, cycloalkyl, aryl, alkaryl, or aralkyl radicals.

As hereinbefore stated, N,N,N',N'-tetrasubstituted 1,3-diamino-2-halopropanes are also suitable starting materials for the production of N,N,N',N',N'',N''-hexasubstituted 1,2,3-triaminopropanes. One prior art method for the preparation of these compounds comprises reacting an excess of a secondary amine with epichlorohydrin and subsequently treating the product with thionyl chloride according to the following reactions.

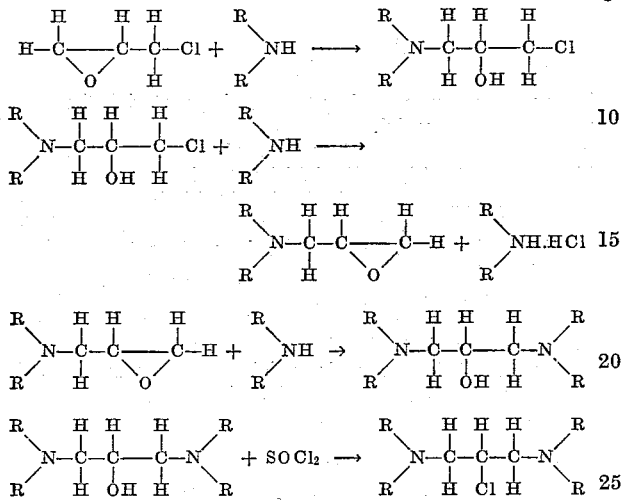

Epichlorohydrin is added, with stirring, to a solution of a secondary amine at a temperature generally in the range between 0 and 40 C. The epichlorohydrin is added at a rate such that the temperature can be controlled at the desired level. The mixture is then stirred at room temperature (20–30 C.) for a period in the range from 15 minutes to 15 or 20 hours to allow time for completion of the reaction. The reaction mixture is then charged to a suitable reactor together with more of the secondary amine wherein the reactants are heated at 105–150 C. for a period in the range between 1 and 15 hours. At the conclusion of the reaction, any amine hydrochloride formed by reaction of the excess secondary amine with HCl formed during the reaction is removed by filtration. Generally a total of 3 to 6 mols of the secondary amine is used per mol of epichlorohydrin. The product obtained is an N,N,N',N'-tetrasubstituted 1,3-diamino-2-propanol.

The foregoing preparation is generally effected in the presence of a solvent. Suitable solvents include benzene, toluene, xylene, chloroform, carbon tetrachloride, pentane, hexane, cyclopentane, methylcyclopentane, cyclohexane, and methylcyclohexane.

The N,N,N',N'-tetrasubstituted 1,3-diamino-2-propanol is converted to the halo compound by treatment with thionyl halide. This reaction is generally effected in the presence of a solvent such as carbon tetrachloride or chloroform. One method of operation comprises adding a solution of thionyl chloride in chloroform or carbon tetrachloride to a solution of the N,N,N',N'-tetrasubstituted 1,3-diamino-2-propanol in the same solvent used for the thionyl chloride. The thionyl chloride is added, with stirring, at a temperature ranging from 5 C. to the reflux temperature and the mixture is then refluxed for a period from 5 minutes to 2 hours to allow time for completion of the reaction. The mixture is then neutralized by the addition of an aqueous solution of a base such as an alkali metal hydroxide or carbonate and the N,N,N',N'-tetrasubstituted 1,3-diamino-2-chloropropane is separated by extracting the reaction mixture with a suitable solvent such as ether, drying the extract, and removing the solvent by distillation. In addition to the foregoing the product can be distilled or purified by any other suitable method.

The N,N,N',N',N'',N''-hexasubstituted 1,2,3-triaminopropanes can be produced from either of the compounds hereinbefore described, i.e, from an N,N-disubstituted 1-amino-2,3-dihalopropane or from an N,N,N',N'-tetrasubstituted 1,3-diamino-2-halopropane, by reaction with a secondary amine, according to the following reactions:

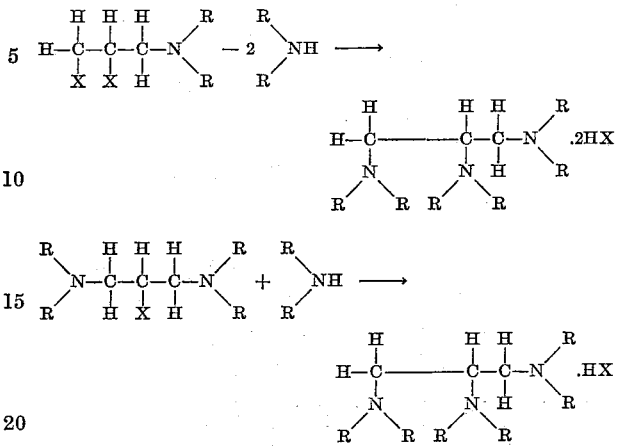

When N,N-disubstituted 1-amino-2,3-dihalopropane is the starting material, from 2 to 6 mols of secondary amine is generally employed per mol of the dihalo compound. These materials are reacted at a temperature in the range between 100 and 200 C. The reaction, although capable of being carried out non-catalytically, is enhanced by the presence of a catalyst, such as copper powder. It is also advantageous, although not necessary to carry out the reaction in the presence of water, usually in a quantity of between about 1 and 5 mols per mol of the amine reactant. Reaction time is generally in the range between about 0.5 and about 5 hours, or greater.

When the starting material is an N,N,N',N'-tetrasubstituted 1,3-diamino-2-halopropane, from 2 to 4 mols of secondary amine is generally employed per mol of the halopropane. These materials are reacted under the same conditions used for the reaction of an N,N-disubstituted 1-amino-2,3-dihalopropane and a secondary amine.

The mixture from either of the foregoing reactions is neutralized and salted out by the addition of an alkali metal hydroxide or carbonate. The organic layer is separated and dried. It may be distilled or purified by any other suitable means.

Secondary amines which can be employed in the preparation of the compounds of this invention include dimethylamine, diethylamine, methylethylamine, dipropylamine, dibutylamine, diisopropylamine, diallylamine, diphenylamine, dibenzylamine, N-methylaniline, cyclohexylbutylamine, dicyclopentenylamine, dietertiarydecylamine, di(2-butylphenyl)amine, dicyclohexenylamine, N-ethyl-aniline, morpholine, piperidine, 2-methylpiperidine, piperazine 2-methyl-5-ethylmorpholine, 2,3-dimethylmorpholine, 4-ethylpiperidine, 3-ethylpiperazine, and the like.

The secondary amine employed as well as other starting materials used are determined by the particular compound which is to be prepared. Examples of compounds which can be prepared are as follows: N,N,N',N',N'',N''-hexamethyl-1,2,3-triaminopropane and the corresponding hexaethyl, hexapropyl, hexabutyl, hexaphenyl and hexabenzyl, 1,2,3-triaminopropanes; N,N-dimethyl-N',N',N'',N''-tetraallyl-1,2,3-triaminopropane; N-methyl-N-phenyl-N',N',N'',N''-tetraethyl-1,2,3-triaminopropane; and N,N,N',N',N'',N''-hexallyl-1,2,3-triaminopropane and the like.

The compounds of this invention have been found, either in the presence or absence of normally liquid hydrocarbons, to function as fuel components which are highly hypergolic and suitable for use in the propulsion of rockets, guided missiles, and the like, when used in conjunction with an oxidizer. These compounds are generally those which contain not more than 24 carbon atoms per molecule. Other compounds of the same type provide fast burning fuels for use in rocket engines wherein a hypergolic fuel is not necessarily required.

The following examples are presented in illustration of the process of this invention:

Example I

A mixture of 210 grams (4.66 mols) of dimethylamine and 200 grams of ether was charged to a 2-liter reactor provided with a stirrer, Dry Ice-acetone condenser, dropping funnel, and means for registering temperature. The temperature was maintained at 5–12 C. while 242 grams (2 mols) of allyl bromide in 200 ml. of ether was introduced over a period of approximately one hour. The reaction mixture was stirred for two hours, during which time it was allowed to come to room temperature (20–30 C.), after which it was filtered and the filtrate distilled. A yield of 90.2 grams (53 weight percent based on the allyl bromide) of N,N-dimethylallylamine was obtained. It boiled at 59–63 C. at atmospheric pressure and had a refractive index at 20 C. of 1.3980.

Hydrogen chloride was passed into an ether solution of N,N-dimethylallylamine to form the salt. Ninety grams (0.74 mol) of the hydrochloride thus formed was dissolved in 400 ml. of dry chloroform. Temperature of the solution was regulated at 10 C. and it was stirred while 150 grams (2.14 mols) of chlorine gas was introduced over a 5-hour period. The mixture was allowed to stand 15 hours at room temperature and then cooled to 10–15 C. and filtered. The solid product, hydrochloride of 1-dimethylamino-2,3-dichloropropane, was dried in a vacuum desiccator.

A 1500 ml. stainless steel bomb was charged with 125 grams (0.7 mol) of 1-dimethylamino-2,3-dichloropropane hydrochloride, 180 grams (4 mols) of dimethylamine, 180 grams of water, and 5 grams of copper powder. The mixture was heated to 177 C. (350 F.), 230 p.s.i.g. pressure, and maintained at this temperature for 2 hours. It was then cooled to room temperature and solid sodium hydroxide was added until the organic layer separated. The organic layer was dried first over sodium hydroxide, then over anhydrous magnesium sulfate, after which it was filtered and the filtrate distilled. A 72 weight percent yield (86.9 grams) of N,N,N',N',N'',N''-hexamethyl-1,2,3-triaminopropane, based on the 1-dimethylamino-2,3-dichloropropane hydrochloride charged, was obained. It boiled at 30–34 C. at 1.2 mm. Hg pressure, had a refractive index at 20 C. of 1.4420, and a density at 22.5 C. of 0.830. The picrate was prepared and had a melting point of 178–178.5 C. Analysis of the picrate gave the following results.

|  | Found, Wt. Percent | Calculated for $C_9H_{23}N_3$, Wt. Percent |
| --- | --- | --- |
| Carbon | 61.7 | 62.4 |
| Hydrogen | 13.3 | 13.3 |
| Nitrogen | 23.0 | 24.2 |
| Chlorine | 0.2 |  |

Example II

A mixture of 159 grams (3.54 mols) of dimethylamine and 250 ml. of benzene was charged to a one-liter reactor provided with a stirrer, Dry Ice-acetone condenser, dropping funnel, and means for registering temperature. The mixture was cooled to 5 C. and 92.4 grams (1 mol) of epichlorohydrin was added slowly (approximately 30 minutes required). During addition of the epichlorohydrin, the temperature increased to 30 C. The reactants were stirred 15 hours at room temperature (20–30 C.), filtered, and the filtrate was charged to a 1500 ml. stainless steel bomb. One hundred grams (2.22 mols) of dimethylamine was charged to the bomb (liquid phase) which was then closed and the contents were heated at 121–127 C. (250–260 F.) for 5 hours. The reaction mixture was removed from the bomb and the dimethylamine hydrochloride was separated by filtration. The benzene was stripped and during this operation some additional dimethylamine hydrochloride separated and was again removed by filtration. After stripping of the filtrate was completed, an 80.8 weight percent yield (117.1 grams) of N,N,N',N'-tetramethyl-1,3-diamino-2-propanol, based on the epicholorhydrin charged, was obtained. It boiled at 78–80 C. at 17 mm. Hg pressure and had a refractive index at 20 C. of 1.4414.

A solution of 78.5 grams (0.66 mol) of thionyl chloride in 48 ml. of dry chloroform was added rapidly, with stirring, to 44 grams (0.3 mol) of N,N,N',N'-tetramethyl-1,3-diamino-2-propanol in 240 ml. of chloroform. The addition required about 13 minutes. The temperature was maintained between 20–35 C. during this period and the mixture was then refluxed for 15 minutes (55–57 C.). The volume was reduced approximately 50 percent by removal of the excess thionyl chloride and solvent under reduced pressure, 75 ml. of water was added, the mixture was cooled to 20 C., and 240 grams of sodium hydroxide in 450 ml. of water was then added with stirring. The mixture was extracted twice with ether, approximately 250 ml. each time, and the other extract was dried over anhydrous magnesium sulfate, filtered, and distilled in a Vigreaux column. A yield of 58.7 weight percent (28.9 grams) of N,N,N',N'-tetramethyl-1,3-diamino-2-chloropropane, based on the diaminopropanol charged was obtained. It boiled at 45–48 C. at a pressure of 3.5 mm. Hg and had a refractive index at 20 C. of 1.4476.

A mixture of 41 grams (0.25 mol) of N,N,N',N'-tetramethyl-1,3-diamino-2-chloropropane 27 grams (0.6 mol) of dimethylamine, 25 grams of water, and one gram of copper powder was charged to a 1500 ml. stainless steel bomb and heated at 177 C. (350 F.), 280 p.s.i.g. pressure, for 2 hours. The reaction mixture was removed from the bomb and neutralized and the organic layer salted out by the addition of sodium hydroxide. The organic layer was separated, dried over anhydrous magnesium sulfate, filtered, and the filtrate distilled. A yield of 85.3 weight percent (36.9 grams) of N,N,N',N',N'',N''-hexamethyl-1,2,3-triaminopropane, based on the chloropropane compound charged, was obtained. It boiled at 41–43 C. at a pressure of 2 mm. Hg. Other properties are summarized below:

| | |
| --- | --- |
| Molecular weight | 173.29 |
| Boiling point, C., 760 mm. Hg, calculated [1] | 145.5 |
| Freezing point, C | −75±5 |
| Viscosity centistokes, 75 F | 1.80 |
| Viscosity centistokes, −40 F | 14.27 |
| Viscosity centistokes, −65 F | 39.60 |
| Density, 20/4 | 0.8407 |
| Refractive index, $n_D^{20}$ | 1.4420 |
| Heat of combustion, B.t.u./lb | 16,528 |

[1] Using Miles vapor pressure estimator.

A drop test apparatus comprising an injection nozzle inserted to within one inch of the bottom of a 1″ x 8″ test tube was employed to determine the ignition delay in milliseconds of N,N,N',N',N'',N''-hexamethyl-1,2,3-triaminopropane. A small quantity of this compound (0.2 ml.) was placed in the test tube and 0.3 ml. of red fuming nitric acid was injected into the fuel. A constant pressure nitrogen surge chamber provided a source of approximately 40 p.s.i.g. pressure to inject the oxidizer into the fuel. A solenoid coil actuated the injector to provide an accurately metered amount of oxidant. The ignition delay interval was determined as the time between contact of the oxidizer with the fuel and the presence of flame as sensed by a photocell. Ignition delay was determined at 75, 0, and −65 F. Results were as follows:

| Ignition delay, milliseconds | |
| --- | --- |
| 75 F | 11.4 |
| 0 F | 16.5 |
| −65 F | 22.5 |

The N,N,N',N',N'',N''-hexamethyl-1,2,3-triaminopropane remained hypergolic when diluted with 30 percent by volume of a hydrocarbon jet fuel (JP-4).

Having thus described the invention by providing specific examples thereof, it is to be understood that no undue restrictions or limitations are to be drawn by reason thereof and that many variations and modifications are within the scope of the invention.

We claim:

1. A process which comprises reacting a material of the formula

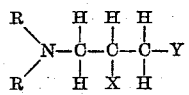

wherein R is selected from the group consisting of alkyl, cycloalkyl, alkenyl, cycloalkenyl, aryl, alkaryl and arylalkyl radicals, said R's can be alike and unlike and the number of carbon atoms in each R does not exceed 10; and radicals which in combination with nitrogen constitute saturated carbon-nitrogen and carbon-nitrogen-oxygen rings having not less than 5 and not more than 6 members of which at least 4 members are carbon atoms which can be alkyl substituted; X is a halogen selected from the group consisting of chlorine, bromine, and iodine; and Y is selected from the group consisting of

R being as hereinbefore described and a halogen selected from the group consisting of chlorine, bromine, and iodine, with a secondary amine at an elevated temperature and recovering a N,N,N',N',N'',N''-hexasubstituted 1,2,3-triaminopropane as a product.

2. A process which comprises reacting a material of the formula

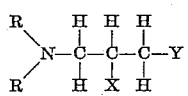

wherein R is selected from the group consisting of alkyl, cycloalkyl, alkenyl, cycloalkenyl, aryl, alkaryl and arylalkyl radicals, said R's can be alike and unlike and the number of carbon atoms in each R does not exceed 10; and radicals which in combination with nitrogen constitute saturated carbon-nitrogen and carbon-nitrogen-oxygen rings having not less than 5 and not more than 6 members of which at least 4 members are carbon atoms which can be alkyl substituted; X is a halogen selected from the group consisting of chlorine, bromine and iodine; and Y is selected from the group consisting of

R being as hereinbefore described and a halogen selected from the group consisting of chlorine, bromine and iodine, with a secondary amine at an elevated temperature in the presence of water and copper catalyst and recovering a N,N,N',N',N'',N''-hexasubstituted 1,2,3-triaminopropane as a product.

3. The process which comprises reacting a material of the formula

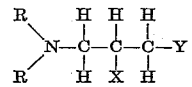

wherein R is selected from the group consisting of alkyl, cycloalkyl, alkenyl, cycloalkenyl, aryl, alkaryl and arylalkyl radicals, said R's can be alike and unlike and the number of carbon atoms in each R does not exceed 10; and radicals which in combination with nitrogen constitute saturated carbon-nitrogen and carbon-nitrogen-oxygen rings having not less than 5 and not more than 6 members of which at least 4 members are carbon atoms which can be alkyl substituted; X is a halogen selected from the group consisting of chlorine, bromine and iodine; and Y is seelcted from the group consisting of

R being as hereinbefore described and a halogen selected from the group consisting of chlorine, bromine and iodine, with a secondary amine at temperature of 100 to 200° C. in the presence of 1 to 5 mols of water per mol of secondary amine and copper catalyst.

4. The process of claim 3 in which R is a methyl group.

5. The process of claim 3 in which R is an ethyl group.

6. The process of claim 3 in which R is a phenyl group.

7. The process of claim 3 in which R is a benzyl group.

8. The process of claim 3 in which R is an allyl group.

References Cited in the file of this patent

UNITED STATES PATENTS

| 2,020,690 | Lauter | Nov. 12, 1935 |
| 2,436,779 | Senkus | Feb. 24, 1948 |

FOREIGN PATENTS

| 711,654 | Great Britain | July 7, 1954 |